May 13, 1958 H. L. HARRISON 2,834,570
SOLENOID VALVE
Filed March 27, 1953

INVENTOR.
HOWARD L. HARRISON
BY
George H Fisher
ATTORNEY

United States Patent Office 2,834,570
Patented May 13, 1958

2,834,570

SOLENOID VALVE

Howard L. Harrison, Minneapolis, Minn., assignor to Minneapolis-Honeywell Regulator Company, Minneapolis, Minn., a corporation of Delaware Application March 27, 1953, Serial No. 345,047

11 Claims. (Cl. 251—129)

This invention pertains generally to an alternating current solenoid valve and is more particularly directed to improvements in alternating current solenoid constructions, especially suited for valve operation.

In alternating current solenoids a constant goal is the design of a quiet and efficient device. Prior art solenoid constructions have included various arrangements of shading means to eliminate humming of the device once it is energized. Generally, the prior art devices have a stop or obstruction which the plunger hits, the location of the stop determining the amount of axial travel of the plunger. The impact of the plunger striking the stop is a source of noise. Some prior art solenoids are designed so that the plunger does not abruptly hit a stop, using various axial cushioning means and methods. These prior art solenoids are satisfactory when energized by direct current, but are still somewhat noisy when energized by alternating current in that the plunger is not centered and stabilized with respect to the solenoid tube. It is a primary object of this invention to provide a quiet solenoid for alternating current energization wherein the plunger does not strike a stop member and wherein the entire plunger is centered and stabilized with respect to the solenoid tube.

Another object of this invention is to provide a solenoid valve wherein the various elements of the solenoid plunger portion thereof are resiliently but firmly held in position with respect to the solenoid tube when the solenoid is energized.

Another object of this invention is to provide means in a solenoid tube and a solenoid plunger assembly whereby the plunger is precluded from rotating or moving with respect to the solenoid tube after the solenoid coil has been energized and the plunger is in the attracted position.

A further object of this invention is to provide a solenoid construction which is superior to prior art constructions.

Further objects of this invention will become apparent upon reading the following detailed description of the invention in conjunction with the accompanying drawings wherein.

Figure 1:
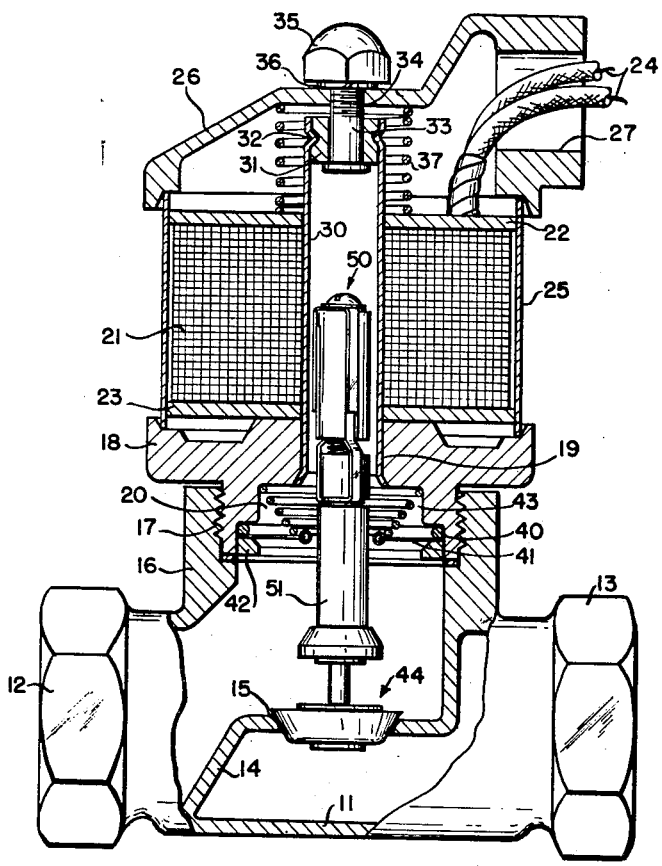
Figure 1 is a longitudinal cross-sectional view of a solenoid operated valve showing the relationship of the improved solenoid plunger with respect to the solenoid tube and coil.

The valve body, designated by the reference numeral 11, has an inlet connection 12 and an outlet connection 13. A partition member 14, having a rounded valve seat opening 15 therein, separates the inlet 12 from the outlet 13. A large annular shoulder 16 having internal threads 17 thereon is provided in the wall of the inlet chamber of the valve in axial alignment with the valve seat opening 15.

Screw-threaded into shoulder 16 of the valve body 11 is a solenoid supporting member 18 having a central aperture 19 therethrough and a downward opening recess 20 both in axial alignment with valve seat opening 15. Mounted above the supporting member 18 is an alternating current electromagnetic coil 21, and above and below said coil 21 are magnetic plates or washers 22 and 23. Lead wires 24 extend upwardly from the alternating current coil 21. Surrounding the coil 21 is a magnetic casing member 25. A cover member 26 abuts the upper end of casing member 25 and has an opening 27 therein through which extend the leads 24 for coil 21.

A non-magnetic conducting tube 30 is located inside of coil 21 and aperture 19 and is secured and sealed to the supporting member 18 in any suitable manner such as by welding, brazing, soldering, or the like. The upper end of the tube 30 is sealed closed by means of a non-magnetic conducting plug 31 being secured to the tube by a grooved arrangement as shown at 32. Extending through and beyond plug 31 is a headed pin member 33 having threads 34 on its upper end. Pin 33 is fixedly attached to plug 31. A suitable hole is provided in cover member 26 so that said cover member fits down over the threaded portion 34 of the pin 33. A nut 35 and a lock washer 36 provide a means of holding together the assembled solenoid support 18, casing member 25, solenoid tube 30 and cover 26. A compression coil spring 37 is disposed around the upper end of tube 30 and between the top of washer 22 and the inside of cover portion 26 so as to maintain a continuous pressure against the coil assembly thus preventing vibration thereof when the same is energized.

Positioned within the recessed portion 20 of solenoid support 18 near the junction of that member with shoulder portion 16 of the valve body 11 is a ring 40 which provides an inwardly spaced line contact bearing surface for a well known type of centering washer 41, such as the one illustrated in the Gille Patent 2,114,961. The centering washer 41 is retained in abutting relationship with ring 40 by means of a retaining ring 42. A conically shaped coil spring 43 is positioned between the centering washer 41 and the top part of the recess 20 in solenoid support member 18. The purpose of the conically shaped coil spring 43 is to partially absorb the shock of an axially moving solenoid plunger, to be described below and to exert a plunger returning force on the plunger when the solenoid is energized.

Positioned within solenoid tube 30 and stabilized near its midpoint by centering washer 41 is a solenoid plunger assembly 50 which has attached to its lower end a valve head assembly 44 which cooperates with the rounded valve seat 15 to control the flow of fluids through valve 11.

The solenoid plunger assembly 50 comprises a main body portion 51 having at its upper end a stud or pin portion 52 of reduced diameter. The extreme upper end of pin portion 52 is threaded as at 53. A first or upper magnetic member 54 of cylindrical shape has a threaded recess at each end thereof. The threaded recess in the lower end of member 54 cooperates with the threaded end of pin 52 to provide a means of securing member 54 to the main body portion 51. A plurality of longitudinally extending slots 55 are provided on the surface of member 54 and extend from the lower end thereof to a point near the top thereof, at which point a beveled surface or shoulder 56 is provided.

A member 58 having a plurality of resilient spring members or fingers 57 bent normal thereto is positioned so that the common portion 58 abuts the upper end of the first magnetic member 54 and such that the resilient members 57 extend adjacent to slots 55. A screw 59 and lock washer 80 cooperating with the threaded recess in the upper end of the first magnetic member 54 serve to secure the common portion 58 of the resilient spring members 57 to the first magnetic member 54.

Figure 2:
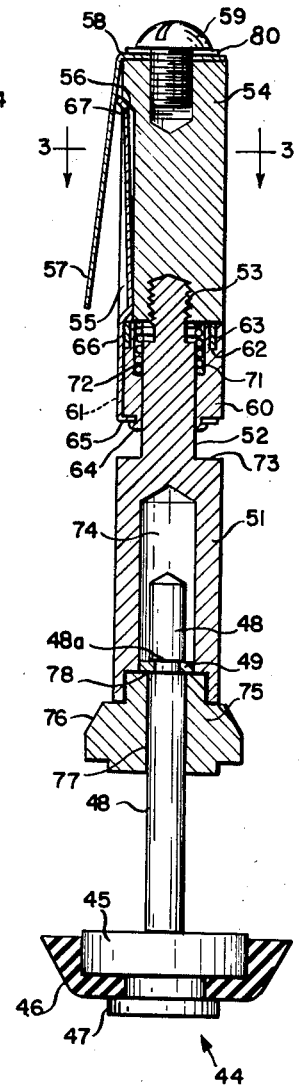
Figure 2 is a longitudinal cross-sectional view of the improved solenoid plunger, this drawing being approximately twice the scale of Figure 1.
Figure 3:
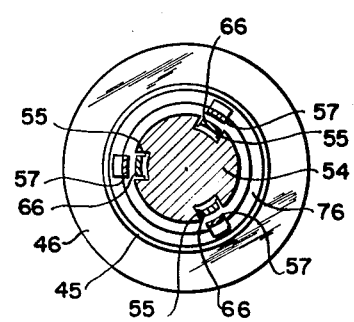
Figure 3 is a transverse cross-sectional view of the improved plunger shown in Figure 2 as viewed along section lines 3—3 of Figure 2.

When coil 21 is deenergized as is shown in Figure 1, spring fingers 57 lie parallel to the surface of first magnetic member 54. In Figure 2, the resilient spring fingers 57 are shown displaced away from the surface of member 54, this being the position assumed by the resilient spring fingers 57 when the solenoid coil 21 is energized. The manner in which this occurs will be described below.

Slideably surrounding pin portion 52 of the main body portion 51 of the plunger assembly 50 is a second or lower magnetic member 60 having a plurality of longitudinal slots 61 extending along its entire length.

Contained within an annular groove 62 in the upper end of the second magnetic member 60 is a shading ring 63 made out of copper or the like. Secured to the lower end of the second magnetic member 60, as by staking or riveting, shown at 64, is a member 65 having a plurality of members or fingers 66 bent normal thereto and extending along the side of member 60 within slots 61 and parallel to and within the slots 55 of first magnetic member 54. The free ends of the fingers 66 are bent as at 67 for a purpose to be described below, and when the coil 21 is deenergized the bent ends 67 are slightly axially spaced away from shoulders 56.

A portion of the material on the inside of the second magnetic member 60 is removed to provide an annular recess 71 between pin portion 52 and member 60. Positioned in annular recess 71 is a coil spring 72, one end of which rests on the bottom of recess 71 and the other end which bears against the lower end of the first magnetic member 54. The action of coil spring 72 is such that it biases magnetic members 54 and 60 away from one another such that the second magnetic member 60 normally bears against a shoulder 73 formed between the main body portion 51 and the pin portion 52.

The main body portion 51 of the solenoid plunger assembly 50 has a cylindrical recess 74 therein starting from the bottom thereof and extending substantially its entire length. A plug member 75 having a bevelled external surface 76 thereon and an internal circular passage 77 therethrough is positioned by a pressed fit arrangement in the recess 74 of the main body portion 51. The diameter of passage 77 is less than the diameter of the recess 74 so that a shoulder portion 78 is provided by the upper end of plug 75.

The valve head assembly 44 has a valve head 45 with a soft facing 46 secured thereto as by headed member 47 and has a valve stem 48 extending through the passage 77 of plug member 75 into the recess 74. A snap ring 49 positioned in a groove 48a on the valve stem 48 is slightly less in diameter than the diameter of recess 74 and hence cooperates with shoulder 78 of plug member 75 so as to prevent the valve head assembly 44 from being separated from the main body portion 51 of the plunger.

When coil 21 is deenergized, the plunger assembly 50 is as shown in Figure 1 with the valve head covering 46 being in engagement with the rounded valve seat 15. In this position the upper end of valve stem 48 is abutting the main body portion 51 at the upper end of recess 74. It will be appreciated that in this position there is a spacing between shoulder 78 and snap ring 49. This is termed a lost motion spacing which allows the main body portion 51 and the upper and lower magnetic members 54 and 60 to be moving upward upon the energization of coil 21 before the valve head assembly 44 is disengaged from valve seat 15. Under this arrangement the moving plunger assembly disengages the valve head assembly from the valve seat 15 with a positive action. When coil 21 is energized, magnetic flux flows through end washer 22, housing member 25, washer 23, and through the first magnetic member 54. Due to the fact that the first magnetic member 54 is not symmetrically located with respect to coil 21 and washers 22 and 23, an upward force will be exerted on it causing it and the main body portion 51 of the plunger assembly 50 to be drawn upward also. The lower magnetic member 60 will also be moved upward by virtue of the fact that it rests against shoulder portion 73 of the main body portion 51. As the plunger assembly 50 is moved upwardly, the lower magnetic member 60 is brought into the proximity of washer 23 and coil 21. When this happens, flux flows, not only through upper magnetic member 54, but also through the lower magnetic member 60. When this happens, a force of attraction will be developed between the upper and lower magnetic members 54 and 60 respectively which will overcome the biasing force of coil spring 72 and bring the upper and lower magnetic members 54 and 60 together. As member 60 moves along pin portion 52 towards upper member 54, the bent ends 67 of the fingers 66 attached to the lower member 60 are pressed against the bevelled surface 56 of the upper member 54. The resultant force acting on fingers 66 is such that they are displaced outwardly such that they engage an intermediate portion of the spring fingers 57 attached to the upper end of the first magnetic member 54. This is the position shown in Figure 2 of the drawing. The free ends of the resilient spring fingers 57 are displaced outwardly and are pressed against the inside surface of the solenoid tube 30 and thus stabilize and center the entire upper portion of the plunger assembly with respect to the solenoid tube and prevent vibration therebetween and also preclude any rotational movement of the plunger assembly with respect to the solenoid tube. At the same time, the bevelled surface 76 of plug portion 75 secured in the recess 74 of member 51 is in engagement with the centering washer 41 and therefore the solenoid plunger assembly is stabilized and centered at both ends in such a way that vibration or noise is precluded.

When coil 21 is subsequently deenergized, coil spring 72 immediately displaces the lower magnetic member 60 away from the upper magnetic member 54 and the resilient spring fingers 57 no longer are displaced away from the side of member 54. Also, due to the combined effects of gravity and the conical spring 43, the solenoid plunger assembly 50 will move downwardly until valve head covering 43 is once again in engagement with valve seat 15.

It is to be noted that to prevent any impact noise, sufficient space is provided at the upper end of the solenoid tube such that the screw 59 never touches pin member 33. A sufficient clearance has been allowed so that even when the plunger assembly over-shoots its point of equilibrium due to inertial forces, contact between the screw and the pin 33 is precluded.

From the above disclosure, it will be obvious to those skilled in the art that I have provided an improved solenoid construction wherein noise has been reduced to a considerable extent.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In a solenoid, a solenoid tube, a coil of wire encircling said tube, and a plunger in said tube, said plunger comprising a first magnetic member, a second magnetic member, said members being relatively movable and spaced away from one another and adapted to be drawn together after said coil is energized, a plurality of members attached at one end to one of said magnetic members and having portions extending adjacent to said tube, means attached to the other of said magnetic members, and means associated with said one of said magnetic members for displacing said first named means into engagement with said plurality of members displacing said plurality of members into engagement with said tube when said first and second magnetic members are drawn together.

2. In a solenoid, a solenoid tube, a coil of wire encircling said tube, and a plunger in said tube, said plunger comprising a first magnetic member, a second magnetic member, said members being relatively movable and resiliently biased away from one another and adapted to be drawn together after said coil is energized, resilient means attached to one of said magnetic members and having portions adjacent to said tube, means attached to the other of said magnetic members extending between said portions and said one of said magnetic members, and means associated with said one of said magnetic members for displacing said last named means away from said one of said members and into engagement with said portions of said resilient means displacing said portions of said resilient means into engagement with said tube when said first and second magnetic members are drawn together.

3. In a solenoid, a solenoid tube, a coil of wire encircling said tube, and a plunger in said tube, said plunger comprising a first magnetic member, means attached at one end of said first magnetic member and extending adjacent to said tube, a second magnetic member movable relative to said first magnetic member and spaced therefrom and adapted to be drawn toward said first magnetic member after said coil is energized, means attached to said second magnetic member extending adjacent to said first magnetic member, and means associated with said first magnetic member for causing said means attached to said second magnetic member to move said first named means into engagement with said tube when said first and second magnetic members are drawn together.

4. In a solenoid, a solenoid tube, a coil of wire encircling said tube, and a plunger in said tube, said plunger comprising a first magnetic member, resilient means attached to said first magnetic member and having portions extending adjacent to said tube, a second magnetic member movable relative to said first magnetic member and resiliently biased therefrom and adapted to be drawn toward said first magnetic member after said coil is energized, a plurality of members attached to said second magnetic member extending adjacent to said resilient means, and means associated with said first magnetic member for causing said members attached to said second magnetic member to move said portions of said resilient means into engagement with said tube when said first and second magnet members are drawn together.

5. In a solenoid, a solenoid tube, a coil of wire encircling said tube, and a plunger in said tube, said plunger comprising a plurality of relatively movable magnetic members spaced from one another and adapted to move axially to one another after said coil is energized and means actuated by said relative motion of said members for supporting said members within said tube.

6. In a solenoid, a solenoid tube, a coil of wire encircling said tube, and a plunger in said tube, said plunger comprising a plurality of relatively movable magnetic members resiliently biased from one another and adapted to move axially to one another after said coil is energized and means actuated by the enerization of said coil for resiliently supporting said members within said tube.

7. In a solenoid particularly adapted to operably control a valve: a solenoid tube extending outwardly from said valve, a coil of wire encircling an intermediate portion of said tube, and a plunger in said tube for actuating said valve, said plunger comprising a first magnetic member having a plurality of longitudinal slots therein, a plurality of resilient members attached to one end of said first magnetic member and having portions extending adjacent to said slots, a second magnetic member movable relative to said first magnetic member and resiliently biased therefrom and adapted to be drawn towards said first magnetic member after said coil is energized, a plurality of members attached to said second magnetic member extending between said resilient members and said slots, and means associated with said first magnetic member for causing said members attached to said second magnetic member to move said portions of said resilient members into engagement with said tube when said first and second magnetic members are drawn together.

8. In a solenoid particularly adapted to operably control a valve: a solenoid tube extending outwardly from said valve, a coil of wire encircling an intermediate portion of said tube, and plunger in said tube for actuating said valve, said plunger comprising a first magnetic member having a plurality of longitudinal slots therein, a plurality of resilient members attached to one end of said first magnetic member and having portions extending adjacent to said slots, a second magnetic member movable relative to said first magnetic member and resiliently biased therefrom and adapted to be drawn towards said first magnetic member after said coil is energized, a plurality of resilient members attached to said second magnetic member extending between said first named resilient members and said slots, and shoulder means associated with said first magnetic member for causing said last named resilient members to move said portions of said first named resilient members into engagement with said tube when said first and second magnetic members are drawn together.

9. In a solenoid particularly adapted to operably control a valve: a solenoid tube extending outwardly from said valve, a coil of wire encircling an intermediate portion of said tube, and a plunger in said tube for actuating said valve, said plunger comprising a first magnetic member, resilient means attached to one end of said first magnetic member and having portions extending adjacent to said tube, a second magnetic member movable relative to said first magnetic member and resiliently biased therefrom and adapted to be drawn towards said first magnetic member after said coil is energized, means on said second magnetic member extending between said resilient means and said first magnetic member, and means on said first magnetic member for displacing said means on said second magnetic member away from said first magnetic member and into engagement with said portions of said resilient means displacing said portions of said resilient means into engagement with said tube when said first and second magnetic members are drawn together.

10. In a solenoid particularly adapted to operably control a valve: a solenoid tube extending outwardly from said valve, a coil of wire encircling said tube, a plunger in said tube for actuating said valve, and resilient means operable to limit axial displacement of said plunger in said tube, said plunger comprising a first magnetic member, resilient means attached to one end of said first magnetic member and having portions adjacent to said tube, a second magnetic member movable relative to said first magnetic member and resiliently biased therefrom and adapted to be drawn toward said first magnetic member after said coil is energized, means on said second magnetic member extending between said resilient means and said first magnetic member, and means on said first magnetic member for displacing said means on said second magnetic member away from said first magnetic member and into engagement with said portions of said first named resilient means displacing said portions of said resilient means into engagement with said tube when said first and second magnetic members are drawn together.

11. In a solenoid particularly adapted to operably control a valve: a solenoid tube extending outwardly from said valve, a coil of wire encircling said tube, and a plunger in said tube for actuating said valve, said plunger comprising a plurality of relatively movable magnetic members resiliently biased from one another and adapted to move axially to one another after said coil is energized and means actuated by the energization of said coil for resiliently supporting said members within said tube.

References Cited in the file of this patent

UNITED STATES PATENTS

| | | |
|---|---|---|
| 678,607 | Wood | July 16, 1901 |
| 744,093 | McLaughlin | Nov. 17, 1903 |
| 2,239,312 | Berges | Apr. 22, 1941 |
| 2,419,333 | Christianson | Apr. 22, 1947 |
| 2,448,959 | Conlan | Sept. 7, 1948 |
| 2,547,098 | Smith | Apr. 3, 1951 |